United States Patent [19]

Maisotsenko et al.

[11] Patent Number: 4,977,753
[45] Date of Patent: Dec. 18, 1990

[54] METHOD FOR INDIRECT-EVAPORATIVE AIR COOLING

[76] Inventors: Valery S. Maisotsenko, Sadovaya, 21, kv. 7, Odessa; Alexandr N. Gershuni, Ulyanovykh, 33, kv. 19, Kiev, both of U.S.S.R.

[21] Appl. No.: 477,892

[22] PCT Filed: Aug. 26, 1988

[86] PCT No.: PCT/SU88/00168
§ 371 Date: Apr. 25, 1990
§ 102(e) Date: Apr. 25, 1990

[87] PCT Pub. No.: WO90/02295
PCT Pub. Date: Mar. 8, 1990

[30] Foreign Application Priority Data

May 12, 1987 [SU] U.S.S.R. ............... 4235877

[51] Int. Cl.⁵ ............................................. F25D 7/00
[52] U.S. Cl. ..................................... 62/121; 62/304; 62/316; 165/54
[58] Field of Search ............... 62/304, 315, 316, 121; 165/54

[56] References Cited

U.S. PATENT DOCUMENTS

| 1,986,529 | 1/1935 | Ray | 62/121 |
| 2,990,696 | 7/1961 | Fisher | 62/314 |
| 4,002,040 | 1/1977 | Munters et al. | 62/121 |
| 4,137,058 | 1/1979 | Schlom et al. | 62/121 |
| 4,380,910 | 4/1983 | Hood et al. | 62/304 |

FOREIGN PATENT DOCUMENTS

| 620745 | 7/1978 | U.S.S.R. | 62/316 |
| 979796 | 12/1982 | U.S.S.R. | |
| 1262209 | 10/1986 | U.S.S.R. | |
| 1504385 | 3/1978 | United Kingdom . | |

Primary Examiner—Albert W. Davis, Jr.
Attorney, Agent, or Firm—Burgess, Ryan & Wayne

[57] ABSTRACT

The main air stream (1) in a room is cooled by passing it along the dry duct (3) and simultaneously passing the auxiliary air stream (7) that has been taken from the atmosphere in a countercurrent flow along the moist duct (9), which is in heat-exchange interaction with the dry duct (3). To provide more intensified cooling the auxiliary stream (7) is precooled in another dry duct (8), which is in heat-exchange interaction with another moist duct (6), by passing a part (5) of the precooled air taken up from the main stream (1), while a part (4) of air is returned to the room. The auxiliary stream (7) is flowing with the aid of an air exhauster (10).

1 Claim, 1 Drawing Sheet

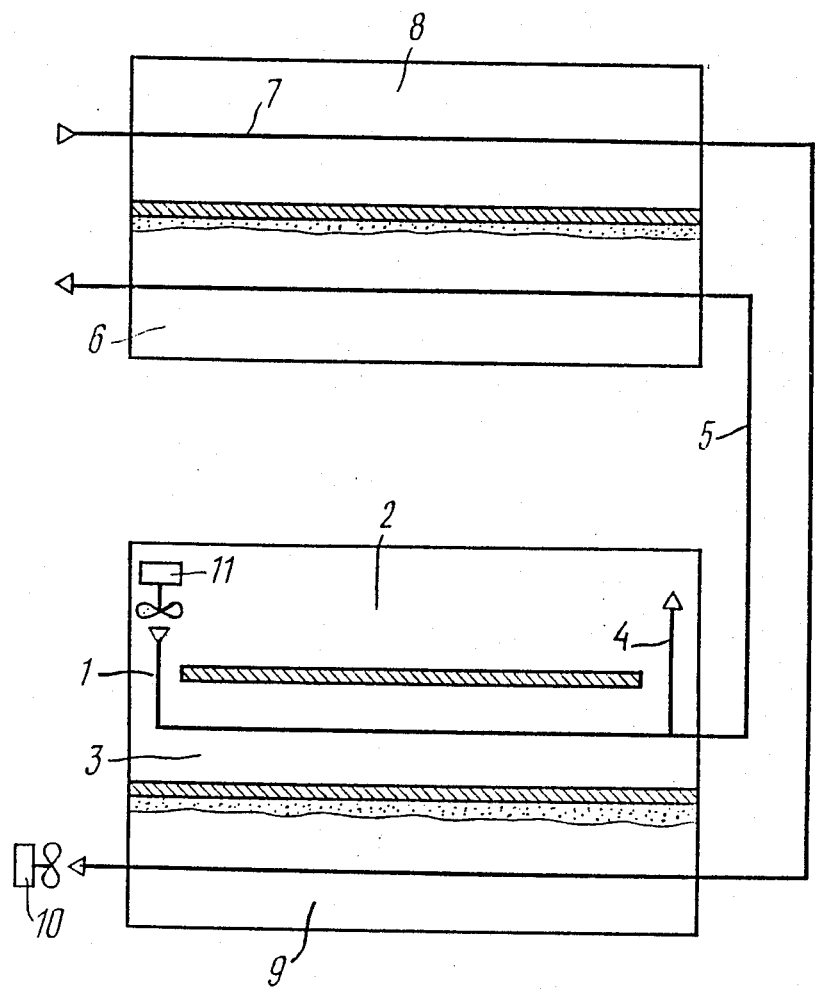

METHOD FOR INDIRECT-EVAPORATIVE AIR COOLING

FIELD OF THE ART

The present invention relates to methods for air cooling with the use of heat-exchangers of the indirect-evaporative type and can find most utility when applied for air cooling in those premises or accomodations which must be isolated from the surrounding atmosphere either for technological reasons or on account of labour protection conditions, etc.

PRIOR ART

In heat-exchangers of the aforesaid type heat is withdrawn from a gas stream called the main stream through a partition wall to a liquid which is evaporation-cooled in another gas stream called the auxiliary stream. The evaporation-cooled liquid is located on the partition wall either as a fine film or in a capillary-porous material covering the surface of the partition wall. The partition-wall surfaces establish ducts or passages along which flow the gas being cooled as the main stream, on one side, and the cooling gas as the auxiliary stream, on the other side. The duct along which the main stream flows is termed the dry dust since it is formed by moisture-proof walls, and the duct along which the auxiliarg stream flows is called the moist duct since it is formed by the moist walls, i.e., those covered with a fine film of liquid or a wettable capillary porous material.

The base method for indirect-evaporative cooling consists in that the gas being cooled is passed along the dry duct in contact with the heat-transfer surface separating the walls, while the cooling gas is passed countercurrently along the moist duct, in the stream of which the liquid vaporizes from the moist wall of the same partition wall, whereby said ducts are in heat-exchange relation.

One state-of-the-art method for indirect-evaporative gas cooling (U.S. application Ser. No. 979,796) is known to consist in that air is cooled by passing its main stream along a dry duct, simultaneously passing the auxiliary air stream counter-currently along a moist duct which is in heat-exchange relation with said dry duct.

More specifically, the auxiliary air stream is obtained by subdividing the total stream into the main and auxiliary streams, the latter stream being directed into the moist duct countercurrently with respect to the main stream.

However, the known method suffers from a number of limitations. A substantial limiation consists in that the methxod fails to provide air cooling by its recirculation; this results in higher power consumption and in pollution of the main stream with the surrounding air in cases where it is impermissible by, e.g., the labour protection conditions.

One more limitation of the known method consists in too low moisture evaporation in the moist duct, which affects adversely the cooling efficiency.

DISCLOSURE OF THE INVENTION

The object of the invention is to provide a method for indirect-evaporative gas cooling, wherein higher cooling efficiency would be attained due to increased masstransfer in the moist duct for the auxiliary air stream.

The object of the invention is accomplished due to the fact that in a method for indirect-evaporative air cooling, consisting in that air is cooled by passing its main stream along a dry duct and simultaneously passing an auxiliary air stream in a countercurrent flow along a moist duct which is in heat-exchange relation with said dry duct, according to the invention, the auxiliary air stream is precooled by being passed along another dry duct which is in heat-exchange relation with another moist duct along which is passed counter currently a part of the precooled air taken up from the main stream, flowing of the auxiliary air stream being effected by sucking it out of the moist duct.

Thanks to the fact that the auxiliary air stream is precooled and is set in motion by its being sucked out of the moist duct here is provided the cooling of the main air stream down to the dew point of the surrounding air.

SUMMARY OF THE DRAWING

In what follows the invention will become more obvious by way of illustration of a specific exemplary embodiment thereof with reference to the accompanying drawing, wherein a diagram of its carrying into effect is represented.

PREFERRED EMBODIMENT OF THE INVENTION

The detailed description of the method of the invention that follows is referenced to an exemplary air cooling in an isolated room, that is, in such a location that has no access of air from without.

As can be seen in the accompanying diagram a stream 1 of air being cooled is taken up from a room 2 and fed into a dry duct 3, whereupon a cooled air stream 4 separated out of the stream 1 that has passed the dry duct 3, is returned to the room 2, while the rest of cooled air stream 5 is directed to a moist duct 6 as the auxiliary air stream.

An auxiliary stream 7 flows along a dry duct 8 countercurrently to the stream 5 passing along the moist duct 6, the dry duct 8 being in heat-exchange interrelation with the duct 6. The auxiliary air stream 7 is taken up from the atmosphere. Next the auxiliary stream 7 flows from the dry duct 8 into the moist duct 9, which is in heat-exchange interaction with the dry duct 3. Motion of the auxiliary stream 7 is effected by sucking said stream out of the moist duct 9, for which purpose an air exhauster 10 is provided at the outlet of the duct 9. The main stream 1 and its derivation, viz., the stream 4 circulate in the room 2 with the aid of a blower fan 11.

The main stream 1 of the air being cooled is taken up from the room 2 and forced by the blower fan 11 into the dry duct 3. Upon getting in contact with the heat-transfer surface of the duct 3 the air is cooled without changing its moisture content and then is subdivided into two streams 4 and 5, whereupon the air stream 4 is returned to the room 2, while the air stream 5 flows along the duct 6, where it performs the function of an auxiliary stream for cooling the stream 7 in the duct 8. Since used as the auxiliary stream for cooling the stream 7 is the precooled stream 5 rather than the surrounding atmospheric air, this in turn results in cooling of the stream 7 down to the dew point of the surrounding air without affecting its moisture content. Then the cooled stream 7 of the surrounding having the aforesaid parameters is sucked-in, as the auxiliary stream, by the air exhauster 10 countercurrently into the moist duct 9, whereas the heated and humidified stream 5 is discharged into the atmosphere through the moist duct 6.

Thus, the air stream 1 flows along the dry duct 3, while the precooled surrounding-air stream 7 performing the function of an auxiliary stream flows countercurrently along the moist duct 9. As a result of heat- and mass-exchange occurring between said air streams indirect-evaporative cooling of the air stream 1 in the room 2 takes place which eventually results at the end of the process in that the air temperature drops down to the dew point of the surrounding air without changing its moisture content. On the other hand, the air stream 7 which absorbs heat has a result of heat withdrawal from the stream 1 and gets humidified due to moisture evaporation from the heat-transfer surface of the moist duct 9, is sucked out by the air exhauster 10 and discharged into the atmosphere.

According to the herein-proposed method for indoor air cooling the surrounding air stream 7 is fed by being induced first into the dry duct 8, then along the moist duct 3. Flowing of said air stream along the ducts 8 and 3 will at all times be accompanied by aerodynamic loss of head due to diverse air-flow resistances. Therefore, the amount of head of the air stream 7 will drop as it flows first along the dry duct 8, then along the moist duct 3. Loss of head of the air stream 7 will result in a reduced partial pressure of aqueous vapours in said stream. This in turn will be conducive to more efficient evaporation of said aqueous vapours from the moist wall of the duct 3 into the air stream 7, thus adding to the cold-generating process of the evaporative cooling. Besides, reduced head of the air stream 7 will lead to a lower temperature of saturation of the aqeuous vapours which in turn will decrease the temperature of said air stream which performs the function of an auxiliary stream in the herein-disclosed method of indirect-evaporative air cooling. Eventually, all the foregoing will result in a higher air cooling efficiency in the room since the cold-generating process will be enhanced and the maximum temperature of the air being cooled in the room will decrease even below the dew point of the surrounding atmospheric air at an atmospheric pressure, this being due to the fact that the pressure of the full air stream 7 will in this case (especially in the moist duct 9) be below the atmospheric.

According to the proposed method, it is expedient to provide additional aerodynamic resistance to the flow of the air stream 7 in order to enhance the evaporative cooling effect. In this case additional power consumption for the air exhauster 10 will in many cases be much lower than the scope of a positive effect obtained from increased water evaporation into the more rarefied air stream 7. The aforesaid additional aerodynamic resistances can be established by, e.g., using diverse porous or developed heat-transfer substances. This affords a further effect, since a higher rarefaction is established in the air stream 7 and the surfaces of heat- and mass-transfer between the streams are increased, a feature that reduces the overall dimensions of appratus realizing the proposed method. Ultimately, this leads to increased efficiency of cooling the room air.

Finally, rarefaction built up as a result of sucking-out the air stream 7 contributes to better wetting of the surface of the moist duct 9. Largely the moist surfaces are made from capillary-porous materials which are wetted with water as a result of its rising along capillaries. Rarefaction occuring in this case adds to the height and rate of water rise, which also enables one to increase the cooling efficiency of the air in the room.

Thus, the proposed method for air cooling in a room makes it possible to substantially increase the cooling efficiency due to intensified mass-transfer in the moist duct 9, as well as improved conditions of wetting the moist heat-transfer surfaces by using the natural psychrometric tempereature difference.

Industrial Applicability

The present method for indirect-evaporative air cooling can be applied for air cooling in premises or accommodations isolated from the surrounding atmosphere, i.e., without access of air from the outside, such as production premises isolated for technological reasons or on account of labour protection conditions, as well as any other rooms that happened to be under extreme conditons, e.g., in cases of environmental pollution as a result of an accident involving escape of radioactive materials or chemical agents.

What is claimed is:

1. A method for indirect-evaporative air cooling, consisting in that air is cooled by passing its main stream (1) along a dry duct (3) and simultaneously passing an auxiliary air stream (7) in a countercurrent flow along a moist duct (9), which is in heat-exchange interaction with said dry duct (3), characterized in that the auxiliary air stream (7) is precooled by being passed along another dry duct (8), which is in heat-exchange interaction with another moist duct (6) along which is passed countercurrently a part (5) of the precooled air taken up from the main stream (1), flowing of the auxiliary air stream (7) being effected by sucking it out of the moist duct (9).

* * * * *